United States Patent

Jurgensen

[15] 3,702,375
[45] Nov. 7, 1972

[54] AMPLITUDE MODULATION TEST CIRCUIT

[72] Inventor: David J. Jurgensen, Hillsboro, Oreg.
[73] Assignee: Tektronix, Inc., Beaverton, Oreg.
[22] Filed: March 17, 1971
[21] Appl. No.: 125,091

[52] U.S. Cl. ............................................178/5.4 TE
[51] Int. Cl. .................................................H04n 9/02
[58] Field of Search ............178/5.4, 5.4 TE, DIG. 4; 325/67, 363

[56] References Cited

FOREIGN PATENTS OR APPLICATIONS 1,076,174  2/1960  Germany..............178/DIG. 4

Primary Examiner—Richard Murray
Attorney—Buckhorn, Blore, Klarquist, Sparkman, Campbell and Leigh

[57] ABSTRACT

A phase shift circuit progressively shifts the phase of a carrier prior to modulation of the carrier in a balanced modulator with a sine wave test pulse which has a time duration equaling a few cycles of the carrier. The modulator output has a sine wave envelope which should be symmetrical about a horizontal axis in an oscilloscope display. A similar sine wave pulse is added to this output of the correct amplitude and phase to cause all of the envelope to be on one side of such axis. If this pulse is sent through a circuit under test and such circuit is operating correctly, one boundary of the envelope in the output is a straight line coincident with such axis. The test pulse has a fixed phase relationship with the carrier so that corresponding cycles of the carrier occupy the same positions in the envelope in the absence of the progressive phase shift referred to above. Under these conditions, the actual coincidence of one boundary of the envelope with a straight line cannot be accurately determined in the oscilloscope display. The progressive phase shift, however, fills the envelope with traces of the carrier to provide a substantially continuous boundary or edge of the envelope for comparison with a straight line.

7 Claims, 4 Drawing Figures

PATENTED NOV 7 1972

3,702,375

DAVID J. JURGENSEN
INVENTOR

BY
BUCKHORN, BLORE, KLARQUIST & SPARKMAN
ATTORNEYS

AMPLITUDE MODULATION TEST CIRCUIT

BACKGROUND OF THE INVENTION

The present invention was developed in connection with the testing of the operation of circuits used to pass color television signals. These signals have two components which are luminance (low frequency) and chrominance (3.58 MHz). A signal that is used in the television industry to test these circuits is the 20T modulated pulse. The 20T pulse is generated on successive lines of a field, then passed through the circuits under test and, if there is any deviation of the boundaries of the pulse, the circuit is not operating properly, i.e., the luminance to chrominance amplitude ratio is incorrect, a delay difference between luminance and chrominance is present or there is a clipping of the signal. Since the boundaries are not seen on an oscilloscope, they cannot be determined accurately.

SUMMARY OF THE INVENTION

In accordance with the present invention, the carrier being supplied to the modulator in the generating circuit is progressively shifted in phase, i.e., phase modulation, during a field of a television raster. The result is that an oscilloscope can be triggered at a line rate, displaying each modulation envelope, slightly advanced in phase with respect to the line it precedes. The result is that the 20T modulated pulse is filled with closely spaced traces of modulated carrier to provide substantially continuous upper and lower boundaries on the envelope of the test pattern. This method of phase shift can also be used in making more accurate measurements on modulator outputs, i.e., rise time of chrominance signals.

It is therefore an object of the present invention to provide an improved circuit for determining the accuracy of circuits that process color television signals.

BRIEF DESCRIPTION OF THE DRAWINGS

FIG. 2 is partly a block diagram and partly a schematic diagram showing details of the phase shift circuit of FIG. 1;

DESCRIPTION OF THE PREFERREE EMBODIMENT

Figure 1:
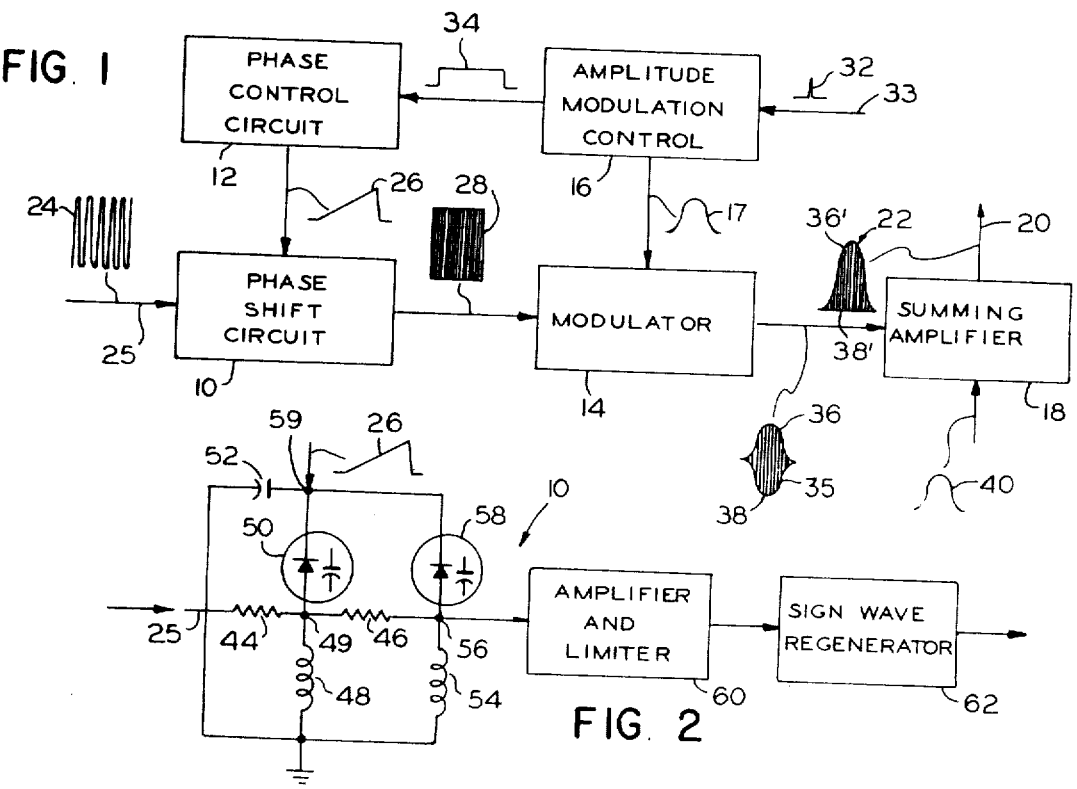
FIG. 1 is a block diagram of the circuit for providing the test pattern of the present invention.

FIG. 1 includes a phase shift circuit 10 controlled by a phase control circuit 12, which drives a balanced amplitude modulator 14. This circuit also includes an amplitude modulation control 16 for supplying a test pulse 17 to the modulator 14 and a summing amplifier 18 receiving the output of the modulator 14 and having an output at 20 which should have the form of the test pattern 22.

A carrier 24 shown at the right of FIG. 1, may, for example, have the frequency of the chrominance subcarrier of a television signal. The subcarrier 24 is ordinarily delivered directly to the modulator 14. In the test circuit of FIG. 1 however, this carrier 24 is first delivered to the input 25 of a phase shift circuit 10. Voltage ramps 26 are delivered at predetermined times to the phase shift circuit 10 from the phase control circuit 12 and during each ramp 26, the phase shift circuit 10 progressively shifts the phase of the carrier 24 so that an oscilloscope display triggered at the beginning of the pulse 17 has an appearance similar to that shown at 28.

The amplitude modulation control circuit 16 supplies sine wave voltage pulses 17 to the modulator 14 in response to input signals, such as trigger signals 32, supplied to the input 33 of the amplitude modulation control circuit. The modulation pulses 17 shown in FIG. 1 start and end at the negative peak voltages of a sine wave of voltage. The amplitude modulation control circuit 16 may also produce a rectangular gating pulse 34 which may start at the end of field blanking and stop at the start of field blanking. Such gating pulse 34 may be delivered to the phase control circuit 12 to cause this circuit to produce the voltage ramp 26 which also starts and ends at the same time as the pulse 34. The phase shift circuit gradually shifts the phase of the carrier 24 in response to the voltage ramp 26 during the unblanking portion of the field.

The phase of the modulation will then also be the same for every field during the interval which is used for vertical interval test signals. This allows the generator to produce a vertical internal test 20T modulated pulse that has a specified phase.

The progressively phase shifted carrier indicated by the oscilloscope display 28 is modulated by the test pulse 17 in the balanced modulator 14. The display on an oscilloscope screen of the output of the modulator when the oscilloscope is triggered at the beginning of the test pulse 17, for example, by the trigger pulse 32, is substantially of the form shown at 35. This display shows upper and lower envelope boundaries 36 and 38, respectively, which should be of the form of the test pulse 17 and of opposite phase. The envelope is filled with traces of the carrier 24 since such carrier is progressively phase shifted during the test pulse interval.

Figure 4:
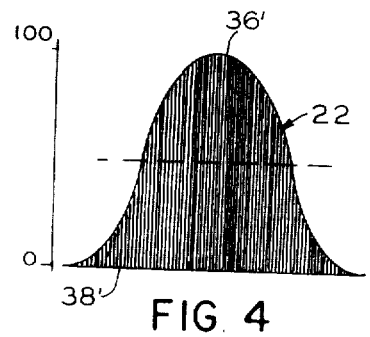
FIG. 4 is a view similar to FIG. 3 of the output of the summing amplifier when the phase shift circuit of FIG. 1 is operating to provide the test pattern of the present invention.

The outlet of the modulator 14 indicated by the display 35 is delivered to the summing amplifier 18 and at the same time a voltage pulse 40, which is the same as the test pulse 17, is also delivered to the summing amplifier 18. The resulting test pattern 22 forming the oscilloscope display at the output 20 of the summing amplifier 18 is of the form 22 also shown on an enlarged scale in FIG. 4. This display has an upper envelope boundary 36' which should be one cycle of a sine wave. If the operation of a circuit under test is correct, i.e., does not involve any distortion of the test pulse 22, the lower boundary of the envelope of the display 22 will be a straight line which can be compared with a straight line on the graticule of the oscilloscope screen. Any departure from a straight line by the envelope 38 indicates that the circuit under test is not operating properly.

Figure 3:
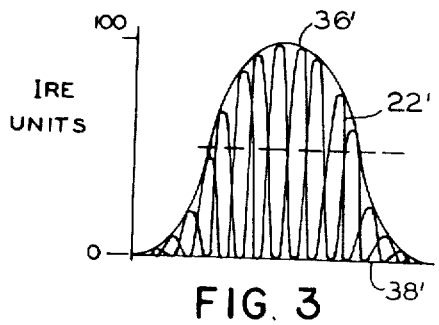
FIG. 3 is a representation of an oscilloscope display of the output of the summing amplifier of FIG. 1 as it would appear if the phase shift circuit of FIG. 1 were disabled.

In the absence of the phase shift circuit 10 the display of the test pattern on the oscilloscope screen would be similar to that shown at 22' in FIG. 3, to which envelope boundaries 36' and 38' have been added. The two traces of the modulated carrier in FIG. 3 results from the interlaced line scanning in television rasters as explained below. Variations of the lower envelope 38' from a straight line can occur between the lower peaks of the waveform of the modulated carrier in the display 22' and would not be detected upon the test pattern of the oscilloscope display of FIG. 3, if this display were expanded horizontally for accurate inspection. Any variations of the envelope 38' from a straight line can, however, be readily detected in the oscilloscope display of FIG. 4 resulting from progressively phase shifting the carrier 24 by the phase shift circuit 10 during test pulse 30.

For testing a balanced amplitude modulator of a television transmitter, a suitable test pulse 17 is a 20T sine wave test pulse. This test pulse has a time duration of 5 microseconds and may have an amplitude of 50 IRE units so that the test pattern 22 should have an amplitude of 100 IRE units on the same scale as the test pulse 17. Since the chrominance subcarrier has a frequency of approximately 3.58 MHz, approximately 17.9 cycles of the carrier 24 occur during the test pulse interval instead of the 8 cycles shown in FIG. 3 for purposes of clarity. Such a test pulse may be applied to the modulator 14 once during each of the lines of the television raster. Successive pulses can occupy the same position on each of such lines and the composite oscilloscope display of such pulses triggered by trigger pulses 32 will show the carrier traces during the pulses on the interlaced lines of both vertical scans of the television raster in a display such as shown at 22' in FIG. 3. Since the chrominance carrier is 180° out of phase during adjacent lines of the raster, two traces of the carrier 180° out of phase appear in the envelope of the display of that figure.

A suitable phase shift circuit for a carrier waveform is shown in FIG. 2. The input 25 of this circuit is at the left of this figure. The signal path for the carrier 24 is through the resistors 44 and 46. A small inductor 48 has one end connected to a junction 49 between the resistors 44 and 46 and has its other end connected to ground or other common connection. A voltage variable capacitor 50 also has one end connected to the junction 49 and its other end connected through a direct current blocking capacitor 52 to ground. The capacitor 52 has substantially greater capacitance than the variable voltage capacitor 50 so that the inductor 48 and voltage variable capacitor 50 are effectively in parallel. Another inductor 54 which may be identical with the inductor 48 has one end connected to a junction 56 at the end of the resistor 46 opposite the junction 49, the other end of the inductor 54 also being connected to ground. Another voltage variable capacitor 58 is connected between the junction 56 and the blocking capacitor 52 so that the inductor 54 is effectively in parallel with the voltage variable capacitor 58. The voltage ramp 26 from the phase control circuit 12 is delivered to the phase shift circuit shown in FIG. 2 at the junction 59 between the blocking capacitor 52 and voltage variable capacitors 50 and 58 so that the voltage ramp 26 will vary the voltage across the voltage variable capacitors 50 and 58.

It will be apparent that no substantial reactive current will flow in the resistors 44 and 46 and no phase shift of the carrier between the input 25 and the junction 56 will occur if the direct current voltage at the junction 59 is such as to cause the capacitive reactances of the variable voltage capacitors 50 and 58 to equal the inductive reactances of the inductors 48 and 54, respectively, at the frequency of the carrier 24. Any decrease in the voltage at the junction 59 will decrease the capacitance of the capacitors 50 and 58 and cause leading current to flow in the resistors 44 and 46 with the result that the alternating voltage of the carrier 24 at the junction 56 will lead the voltage of the carrier at the input 25. Any increase in direct current voltage at the junction 59 will have the opposite effect and cause the voltage of the carrier 24 at the junction 56 to lag the voltage of the carrier at the input 25. Even if the two phase shift circuits including the variable voltage capacitors 50 and 58 do not produce zero phase shifts at any given direct current voltage at the junction 59, if the two circuits produce substantially similar phase shifts, a voltage can be supplied at this junction which will cause the phase shifts across the two resistors 44 and 46 to be equal and opposite so as to result in zero phase shift of the carrier 24 at the junction 56.

The phase shift circuit shown in FIG. 2 is capable of a total phase shift approaching 360°, although the amplitude of the phase shifted carrier decreases with the angle of phase shift from a maximum amplitude at the zero phase voltage at the junction 59. Thus the voltage ramp 26 can start at a voltage less than such zero phase shift voltage and increase to a substantially equal voltage above the zero phase shift voltage. In the absence of the voltage ramp 26 the phase shift of the carrier can be set at zero. A suitable phase shift is 90° from both sides of the zero phase shift condition so that amplitude variation of the output from the junction 56 is not excessive. Also within this range, the phase shift or phase modulation is substantially linear with time.

A phase modulated carrier of constant amplitude is, however, desired. The output from the junction 56 is therefor delivered to an amplifier and limiter circuit 60 which amplifies and clips the phase shifted sine wave to produce a substantially square wave of substantially constant amplitude which can be employed to regenerate a sine wave of substantially constant amplitude in a sine wave generator circuit 62, which may be of any known or suitable type. The output of the sine wave regenerators 62 of the phase shift circuit 10 produces a display on an oscilloscope of the type shown at 28 in FIG. 1 when the oscilloscope display is triggered at the beginning of each 20T pulse 22, for example, by the trigger pulse 32.

I claim:

1. A test circuit for testing the accuracy of operation of a circuit that carries a color television signal; which comprises:

modulation control means for supplying a modulation signal to a modulating circuit to produce an output having an envelope with upper and lower boundaries having the form of said modulation signal with one of said boundaries in phase opposition to the other;

means for adding said modulation signal to said output in phase with one of said boundaries of said envelope to produce a modulated signal in which one boundary of the envelope of said modulated signal is a straight line only when the operation of said modulating circuit is accurate;

and phase shift means for phase modulating a carrier prior to supplying said carrier to said modulating circuit to insure that said envelope of said modulated signal has a substantially continuous boundary for comparison with a straight line.

2. The test circuit of claim 1, in which: said modulation control means includes means for producing a modulation signal in the form of a series of test pulses each of which is a cycle of a sine wave starting and ending at adjacent peaks of the sine wave to thereby produce a series of output pulses from said modulator each of which have an envelope with sine wave upper and lower boundaries starting and ending at the central horizontal axis of said oscilloscope display.

3. The test circuit of claim 2, in which said modulation control means produces one of said test pulses during each line of a television raster;

and said phase modulation means includes means for substantially shifting the phase of said carrier during each field of said raster.

4. The test circuit of claim 3, in which:

said phase modulation means includes means for shifting said phase substantially 180° during each field of said raster.

5. The test circuit of claim 3, in which:

said phase modulation means includes a signal path for supplying said carrier to said amplitude modulation circuit and a resistor in series with said path and a parallel connected inductor and a voltage variable capacitor in shunt with said path at the end of said resistor adjacent said amplitude modulation circuit;

and phase control means for applying a ramp voltage across said capacitor during each field of said raster.

6. The test circuit of claim 5, in which:

said signal path contains two resistors in series and a parallel connected inductor and voltage variable capacitor in shunt with said path at the end of each of said resistors which is adjacent said amplitude modulation means;

and said phase control means aPplies said ramp voltage across each of said capacitors.

7. The test circuit of claim 6, in which:

said phase control circuit maintains the phase of said carrier the same during each vertical interval of each field of said raster.

* * * * *